(12) United States Patent
Nutsos

(10) Patent No.: US 8,464,783 B2
(45) Date of Patent: Jun. 18, 2013

(54) METHOD AND ARRANGEMENT FOR OPTIMIZING HEAT TRANSFER PROPERTIES IN HEAT EXCHANGE VENTILATION SYSTEMS

(76) Inventor: Mikael Nutsos, Tullinge (SE)

( * ) Notice: Subject to any disclaimer, the term of this patent is extended or adjusted under 35 U.S.C. 154(b) by 854 days.

(21) Appl. No.: 12/282,384

(22) PCT Filed: Mar. 9, 2007

(86) PCT No.: PCT/SE2007/050141
§ 371 (c)(1),
(2), (4) Date: Sep. 10, 2008

(87) PCT Pub. No.: WO2007/106030
PCT Pub. Date: Sep. 20, 2007

(65) Prior Publication Data
US 2009/0044935 A1 Feb. 19, 2009

(30) Foreign Application Priority Data

Mar. 10, 2006 (SE) ........................ 0600569

(51) Int. Cl.
*G01K 13/00* (2006.01)
*F28F 27/00* (2006.01)
*F28F 13/00* (2006.01)
*B01J 49/00* (2006.01)
*B01D 37/00* (2006.01)

(52) U.S. Cl.
USPC ............. 165/301; 62/129; 165/200; 165/276; 137/3; 137/110; 210/96.1; 210/790

(58) Field of Classification Search
USPC .............. 62/127, 129; 165/11.1, 47, 200, 165/218, 276, 301, 909; 210/96.1, 149, 167.32, 210/181, 740, 742, 790; 252/70, 71; 374/141, 374/142, 159; 137/3, 79, 80, 88, 110
See application file for complete search history.

(56) References Cited

U.S. PATENT DOCUMENTS 4,529,413 A * 7/1985 Ferguson ........................ 95/166
4,531,538 A * 7/1985 Sandt et al. .................... 137/334

(Continued)

FOREIGN PATENT DOCUMENTS

JP 59-1933 A 1/1984
JP 61240094 A 10/1986

(Continued)

OTHER PUBLICATIONS

2009 ASHRAE Handbook—Fundamentals, Chapter 31, Physical Properties of Secondary Fluids.*

(Continued)

*Primary Examiner* — Frantz Jules
*Assistant Examiner* — Henry Crenshaw
(74) *Attorney, Agent, or Firm* — Young & Thompson

(57) ABSTRACT

The present invention relates to a method and arrangement of optimizing the level of anti freeze agent in a heat transfer fluid in a heat exchange system The method comprises determining (305) a wanted level of anti freeze agent at least partly based on the temperature of the media to which the heat exchange system will deliver heat, controlling (310) the current level of the anti freezing agent in the heat transfer fluid. Anti freezing agent is added 315:1 to the heat transfer fluid if the current level is a predetermined amount lower than the wanted level, and removed 315:2 from the heat transfer fluid if the current level is a predetermined amount higher than the wanted level.

14 Claims, 3 Drawing Sheets

U.S. PATENT DOCUMENTS

| | | | | |
|---|---|---|---|---|
| 5,018,645 | A | * | 5/1991 | Zinsmeyer ............... 222/14 |
| 5,626,770 | A | | 5/1997 | Pacosz |
| 6,221,276 | B1 | | 4/2001 | Sarin |
| 6,365,291 | B1 | * | 4/2002 | Margiott ............... 429/414 |
| 2003/0029340 | A1 | | 2/2003 | Kussmann |
| 2003/0066906 | A1 | * | 4/2003 | Krause et al. ............ 239/284.1 |
| 2003/0216837 | A1 | * | 11/2003 | Reich et al. ............ 700/276 |
| 2008/0229780 | A1 | * | 9/2008 | Wyatt et al. ............ 62/502 |

FOREIGN PATENT DOCUMENTS

| | | | |
|---|---|---|---|
| JP | 61-246564 | A | 11/1986 |
| JP | 62-008571 | U | 1/1987 |
| JP | 63-049438 | U | 4/1988 |
| JP | 4-110534 | A | 4/1992 |
| JP | 4295527 | * | 10/1992 |
| JP | 5231680 | A | 9/1993 |
| JP | 8094131 | A | 4/1996 |
| JP | 1068598 | * | 3/1998 |
| JP | 1068598 MT | * | 3/1998 |
| JP | 10068598 | A | 3/1998 |
| JP | 10300386 | A | 11/1998 |
| JP | 2002139236 | A | 5/2002 |
| JP | 2004150776 | A | 5/2004 |
| JP | 2006-029607 | A | 2/2006 |
| WO | 97/11318 | A1 | 3/1997 |
| WO | 97/15794 | A1 | 5/1997 |

OTHER PUBLICATIONS

Translation of Japanese Office Action, dated Feb. 24, 2012, from corresponding application 2009-500331.

* cited by examiner

METHOD AND ARRANGEMENT FOR OPTIMIZING HEAT TRANSFER PROPERTIES IN HEAT EXCHANGE VENTILATION SYSTEMS

The present invention relates to methods and arrangements for optimizing heat transfer properties of heat transfer fluids. In particular the invention is applicable to heat exchange ventilation systems.

BACKGROUND OF THE INVENTION

Modern ventilation systems, both for domestic use, public buildings and industrial premises, are frequently provide with heat exchange, or heat recovery systems. The basic principle for such systems is that heat is taken from outgoing air and used to preheat incoming air. A number of different design principles [add ref] are utilized for the heat exchange. According to one design principle heat batteries in the form of metal plates are alternately heated (collecting heat) and cooled (deliver heat) by being placed alternately in an outgoing air stream and an ingoing air stream, respectively. If the air streams are switched to a stationary heat battery, the exchange assembly is referred to as a switching heat exchanger. Another implementation of the same principle is the rotary heat exchanger, wherein the heat batteries are placed in a rotating arrangement moving the plates of the heat battery from the outgoing (heated) air stream to the incoming air stream (cool).

Large scale installations of ventilation systems with heat exchange facilities, such as those found in larger office buildings, public buildings and industries, often relies on heat exchange arrangement using a heat transfer fluid for transferring heat from the outgoing air stream to the incoming air stream. A prior art ventilation system utilizing a heat transfer fluid arrangement is schematically illustrated in FIG. 1. The ventilation system 100 comprises an incoming air duct 105 provided with a fan 110 for forcing air into the premises. An outgoing air duct 115 vents the air out of the premises with the aid of the fan 120. The thick arrows indicate the direction of the flow of air. The outgoing air duct 115 is provided with a heat collector unit 125, for example in the form of a radiator. The ingoing air duct 105 is provided with a heat delivery unit 130, preferably also in the form of a radiator. The heat collector unit 125 is connected to the heat delivery unit 130 with a tubing arrangement 135, forming the heat exchange system. The heat exchange system may in addition include one or more circulation pumps and expansion vessels etc. A heat transfer fluid is circulated in the heat exchange system (the narrow arrow indicate the flow of the heat transfer fluid). The heat of the outgoing air heats the heat transfer fluid in the heat collector unit 125 and the heat transfer fluid transfer the heat to the heat delivery unit 130, which warms the incoming air. The heat transfer fluid should have suitable thermodynamical properties for receiving and delivering heat as well as suitable fluidic properties. In most cases water is the most suitable heat transfer fluid. However, in certain application and in certain areas were will be a risk of the heat transfer fluid freezing in the heat delivery unit 130, wherein the heat transfer fluid is cooled down. This can be true in the tempered part of the world, wherein during a winter day the incoming air could be significantly below the freezing point of water. It should be noted that the freezing effect at the heat delivery unit 130 is not only dependent of the temperature of the incoming air, but also of the speed of the air flow, typically giving an effective freezing effect significantly lower than indicated by the temperature alone. Freezing of the heat transfer fluid leads to immediate malfunction of the heat exchange and possibly also causing shutdown of the entire ventilation system.

Freezing of the heat transfer fluid is inhibited by adding an anti freeze agent to the heat transfer fluid. Several anti freeze agent are known in the art and can be divided into two main groups: Anti freeze agents based on salt solutions, for example alkali salts, and anti freeze agents based on organic compounds, for example alcohol or glycol. Several anti freeze agents are known in the art and widely used for freezing inhibition in different kinds of application. A range of anti freeze agents are commercially available and sold under different brand names such as [add ref]. In table 1 a range of anti freeze agents and their properties are listed. The listed freezing points refer to different mixing proportions of the anti freeze agent and the water, and reflects the typical usage, wherein an operator has specified what freezing point is accepted by the heat exchange system and adds an amount of anti freeze agent to the heat transfer fluid to achieve the mixing proportions corresponding to the determined freezing point.

Table 1 illustrates the effectiveness regarding lowering the freezing point using these known anti freeze agent. Upon inspection another inherent property of the anti freeze agent is apparent, that the heat transfer capacity of the heat transfer fluid (is strongly adversely affected by the addition of anti freeze agent. Taking the common anti freeze agent polypropylene glycol as an example, mixing with water so that a freezing point of $-10°$ C. is achieved results in a reduction of the heat transfer capacity with about 30% as compared to pure water. If polypropylene glycol was added in an amount to let the heat transfer fluid has a freezing point at $-30°$ C. the reduction of heat transfer capacity will be in the order of 60%. The efficiency of the heat exchange system follows the heat transfer capacity of the heat fluid, and can never be better than that value.

In large scale installations the amount of freezing agent in the heat transfer fluid is typically decided on at installation and only changed at large maintenance operations. Typically the mixing proportions, often referred to as the level of anti freezing agent, is checked during regular maintenance and, if the level is found to be to low, anti freeze agent is added.

The above described scenario is problematic in an energy recovery perspective. The level of anti freeze agent is typically determined for a worst case scenario. In northern Scandinavia, for example, adapted to handle incoming air at a temperature of $-30°$ C. or below, which depending on the anti freeze agent used, gives a decreased heat transfer capacity of 40-60%. Typically this low freezing point is only required a few days each year, even in northern Scandinavia. As the level of anti freeze agent is typically not changed the heat exchange system operates with the same low efficiency also then not needed due to the outside conditions. As this is the vast majority of the time, the losses in efficiency, measured on a yearly basis, are very large. Also in areas with less cooled winters, for example central Europe, wherein a heat exchange system typically should be designed for occasional freezing weather. Also in this case, with a heat transfer fluid with a freezing point of for example $-8°$ C., the losses will be significant. Thus were is a problem of optimizing the level of anti freezing agent both to lower the freezing point to a sufficient temperature and at the same time keep the heat transfer capacity as high as possible.

A further problem arises from the fact that improper mixing of different anti freezing agents can lead to problems in analysing the level. The percentage of anti freezing agent in the heat exchange fluid is often measured by a simple refractive measurement, which gives a decent estimate. The measurement method is normally reliable, but if certain anti freeze agents are mixed, for example glycol based anti freeze agents of different kinds, the measurement may become unreliable. Typically the measurement is affected in the way that it indicates a lower level of anti freeze agents than the actual level. This will lead the operator to add even more anti freeze agent, typically resulting in a heat transfer fluid with a freezing temperature way lower than any conceivable temperature. It should be noted that from the perspective of the thermal properties of the heat transfer fluid, it is in many cases acceptable, or in some cases possibly even advantageous, to mix different anti freezing agents at least within the two basic categories. The problem arises from the effect on the measurement method. The problem is accentuated by that anti freeze agents are typically sold by their product name, and it is not evident for an operator of a ventilation system what the active substances are, nor their mixing properties.

A further problems comes from the fact that operators often with very limited knowledge of the drawbacks of reducing the heat transfer capacity, often adds significantly more anti freezing agent than recommended, just to be sure that the system will not freeze. This further reduces the efficiency of the heat exchange system.

The problem of having low heat transfer capacity due to a level of anti freeze agent that is unnecessary high most of the time is not limited to heat exchange systems for ventilation purposes. The same problems may occur in for example sun panel arrangements, greenhouse heating systems, systems for heating roads, airstrips and outdoor pedestrian areas.

Methods of separating anti freeze agents from water is known in the art, and utilized mainly for environmental purposes, as the anti freeze agents often are considered as pollutants. Large scale systems for separating anti freeze agents from water are frequently found in airports and used to take care of the large amount of anti freeze substances used then defrosting aircrafts. U.S. Pat. No. 5,626,770 describes a system for taking care of the coolant from vehicles, by the use of a series of filters. The purpose being the same as the airport systems.

TABLE 1

| Name | Temperature of medium (° C.) | Freezing point (° C.) | Transfer (W/m²K) | Transfer (%) |
| --- | --- | --- | --- | --- |
| Temper (salt dissolved in water) | 0 | −10 | 1768.6 | 0 |
| Ethylene glycol - water | 0 | −10 | 1514.8 | −14 |
| Ethanol - water | 0 | −10 | 1293.4 | −27 |
| Propylene glycol - water | 0 | −10 | 1248.9 | −29 |
| Temper (salt dissolved in water) | 0 | −30 | 1455.4 | 0 |
| Ethylene glycol - water | 0 | −30 | 1004.8 | −43 |
| Ethanol - water | 0 | −30 | 898.2 | −49 |
| Propylene glycol - water | 0 | −30 | 666.6 | −62 |
| Temper (salt dissolved in water) | 0 | −10 | 1768.6 | 0 |
| Temper (salt dissolved in water) | 0 | −30 | 1455.4 | −18 |
| Ethylene glycol - water | 0 | −10 | 1514.8 | 0 |
| Ethylene glycol - water | 0 | −30 | 1004.8 | −34 |
| Ethanol - water | 0 | −10 | 1293.4 | 0 |
| Ethanol - water | 0 | −30 | 898.2 | −31 |
| Propylene glycol - water | 0 | −10 | 1248.9 | 0 |
| Propylene glycol - water | 0 | −30 | 666.6 | −47 |

SUMMARY OF THE INVENTION

The objective problem is to provide a method and an arrangement for controlling the level of anti freeze agents in heat exchange systems, and whereby optimize the efficiency of the heat exchange system.

The problem is solved by the method as defined in claim 1 and the system as defined in claim 4.

The present invention provides a method and arrangement of optimizing the level of anti freeze agent in a heat transfer fluid in a heat exchange system The method comprises determining a wanted level of anti freeze agent at least partly based on the temperature of the media to which the heat exchange system will deliver heat, controlling the current level of the anti freezing agent in the heat transfer fluid. Anti freezing agent is added to the heat transfer fluid if the current level is a predetermined amount lower than the wanted level, and removed from the heat transfer fluid if the current level is a predetermined amount higher than the wanted level.

According to one embodiment of the invention the wanted level of anti freeze agent is determined based also on long term measurements of the temperature of the incoming media. Alternatively, or as a complement, weather forecasts provided by an external source can be used in the determining process. By gathering and analysing statistics of the chosen levels of anti freeze agent at different outside temperatures and resulting temperature of the heat transfer fluid an automatic adaptation to the local installation and conditions can be made.

A heat exchange system according to the invention transports heat from a first media to a second media via heat transfer fluid, the heat collected with a heat collector unit (225) and delivered with a heat deliver unit (230) in fluid communication with each other. The heat exchange system comprises a separator adapted to separate anti freeze agent from the heat transfer fluid, a remixer adapted to add anti freeze agent to the heat transfer fluid and a temperature sensor monitoring the temperature of the first media prior to the heat delivery unit. A control unit analyse the temperature data and orders the separator to remove antifreeze agent from the heat transfer fluid or the remixer to add antifreeze agent to the heat transfer fluid, if required. The control unit may further be provided with external communication means for receiving external temperature or weather forecasts.

Thanks to the inventive system and method it is possible to optimize the level of anti freeze agent in a heat exchange system with regards to the outside temperature and conditions. This in turns prevents an unnecessary low heat transfer capacity and hence low energy recovery efficiency of the system.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, in which.

DETAILED DESCRIPTION OF THE INVENTION

Figure 1:
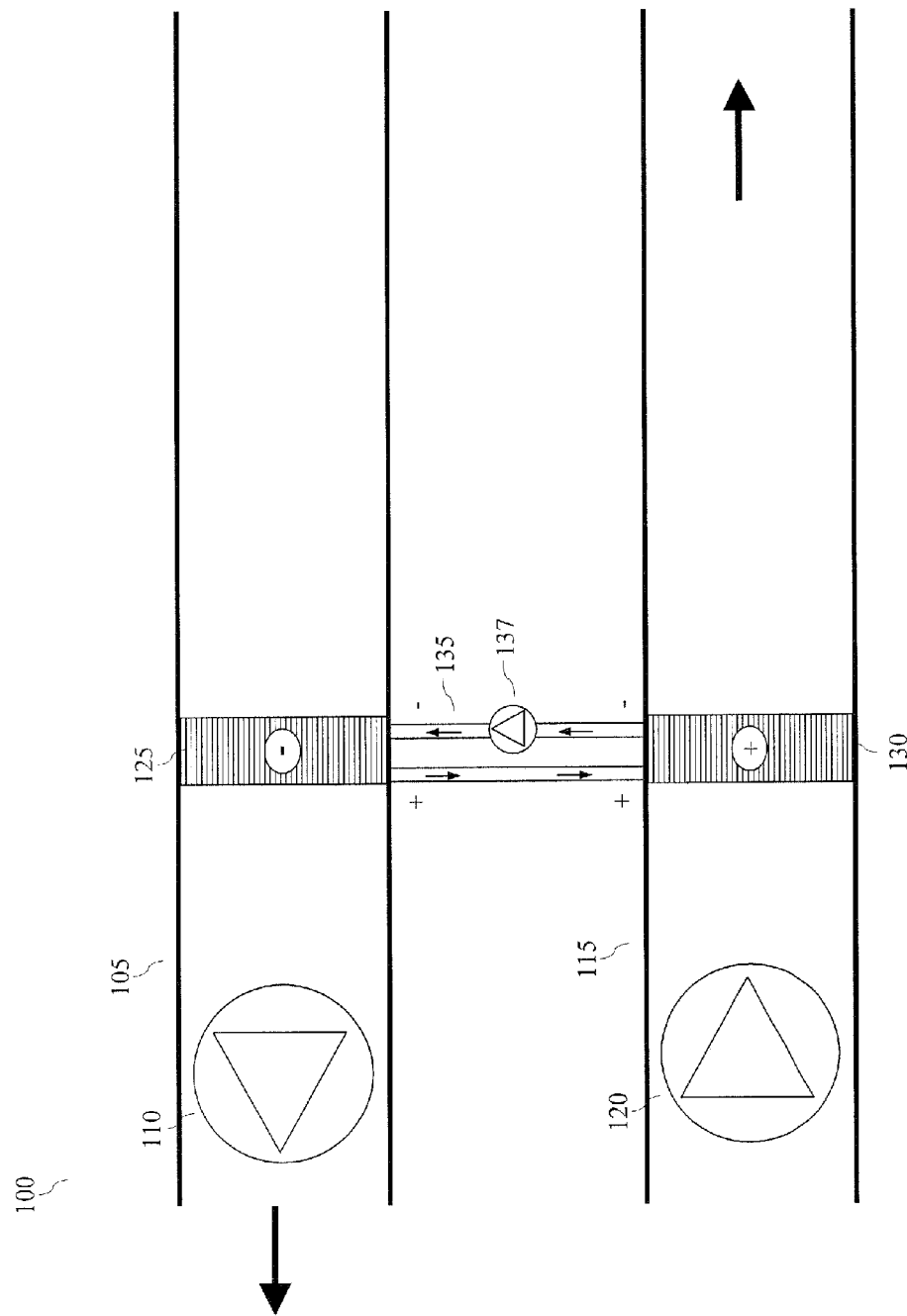
FIG. 1 is a schematic view of a prior art heat exchange system for ventilation purposes.
Figure 2:
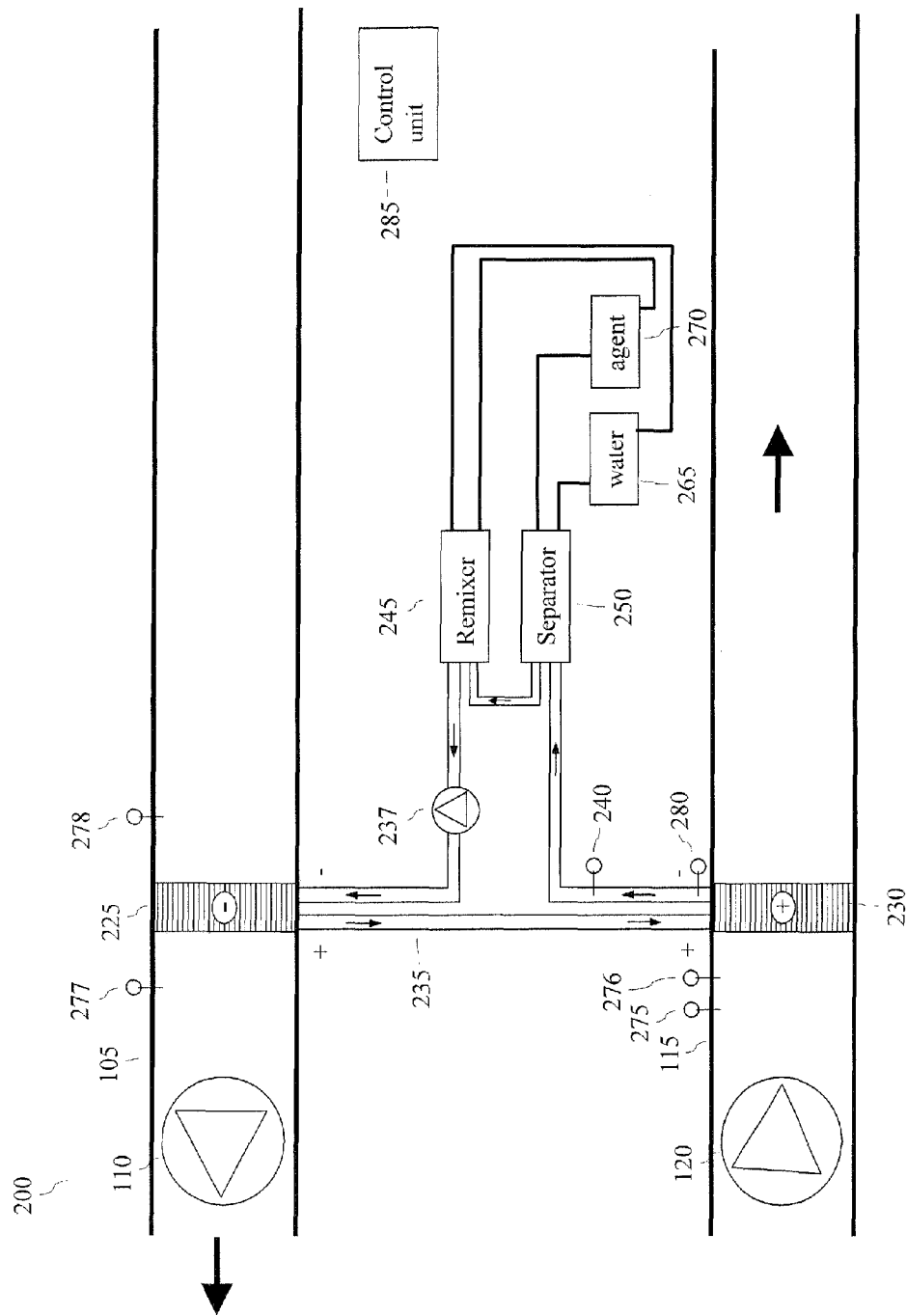
FIG. 2 is a schematic view of a anti freeze agent control system according to the invention.

The principle of the present invention will be described with reference to the schematic illustration of FIG. 2. The heat exchange system 200 according to the invention is here exemplified in an ventilation system 100 comprising an incoming air duct 105 provided with a fan 110 for forcing air into the premises. An outgoing air duct 115 vents the air out of the premises with the aid of the fan 120. The thick arrows indicate the direction of the flow of air. The outgoing air duct 115 is provided with a heat collector unit 225, for example in the form of a radiator. The ingoing air duct 105 is provided with a heat delivery unit 230, preferably also in the form of a radiator. The heat collector unit 225 is connected to the heat delivery unit 230 with a tubing arrangement 235, which are part of the heat exchange system 200. The heat exchange system 200 may in addition include one or more circulation pumps, vales and expansion vessels etc, which are, for the skilled person, known means for designing such circulating system. A heat transfer fluid with a certain level of anti freeze agent is circulated in the heat exchange system (the narrow arrow indicate the flow of the heat transfer fluid). The heat of the outgoing air heats the heat transfer fluid in the heat collector unit 225 and the heat transfer fluid transfer the heat to the heat delivery unit 230, which warms the incoming air. The anti freeze agent reduces the risk of the heat transfer fluid freezing in the heat delivery unit 230, wherein the heat transfer fluid is cooled down.

According to the invention the heat exchange system 200 is provided with a anti freeze agent level indicator 240, an anti freeze agent separator 245 and an anti freeze agent remixer 250. The separator 245 and the remixer 250 are preferably connected via a tubing arrangements 255, 260 which includes storage tanks for water 265 and anti freeze agent 270, respectively. The design, properties and capacity of the anti freeze agent level indicator 240, the separator 245 and the remixer, has to be adopted to the heat exchange system in question and in particular to the anti freeze agent, or agents used. The anti freeze agent level indicator 240 may be capable to measure the level directly and/or characterize the heat transfer fluids in other ways for example by measuring the density and viscosity of the heat transfer fluid. Thus, the anti freeze agent level indicator 240 can be designed to give a characterisation of the properties of the heat transfer fluid.

The heat exchange system preferably comprises a number of sensors: An incoming air temperature sensor 275 provided in the incoming air 105 prior to the heat delivery unit 230. The incoming air temperature sensor 275 may be design to give the actual cooling power of the incoming air, i.e. taking the flow of the air into account. Alternatively the incoming air temperature sensor 275 is complemented with a flow sensor 276. A heat transfer fluid temperature sensor 280 is provided close after, in the direction of the flow of the heat transfer fluid, the heat delivery unit 230. Alternatively the heat transfer fluid temperature sensor 280 is provided within the heat delivery unit 230. For efficient controlling of the processes the heat exchange systems 200 may be provided with further temperature sensors indicating for example the temperature of the incoming air after the heat delivery unit 230 and the outgoing air. An arrangement of temperature sensors, 277 and 278 before and after the heat collector unit 225 in the outgoing air duct 105 can provide a significant measure on the efficiency of the heat collector, and hence also on the properties of the heat transfer fluid.

The heat exchange system is controlled by a control unit 285, which is in connection with the separator 245, the remixer 250, the anti freeze agent indicator 240 and the temperature sensors 275, 280. For the reasons of clarity of the drawing these connections are not shown. The connections can be via cable arrangements or wireless. The control unit 285 may be provided with external communication means to be able to receive weather, especially temperature, forecasts. The control unit 285 is also adapted to receive and store the relation between anti freeze level and freezing point for at least one, but preferably a set of anti freeze agents. Also combination of anti freeze agents should preferably be possible to handle by the control unit 285. The control unit 285 can be in the form of a PC, or a dedicated PLC, for example, and is preferable integrated with controlling equipment typically used in large scale ventilation systems.

According to the method of the invention the heat exchange system 200 assures that the level of anti freeze agent always is at an appropriate level as compared to the outside conditions, primarily the outside temperature. This is made possible by the means described above.

Figure 3:
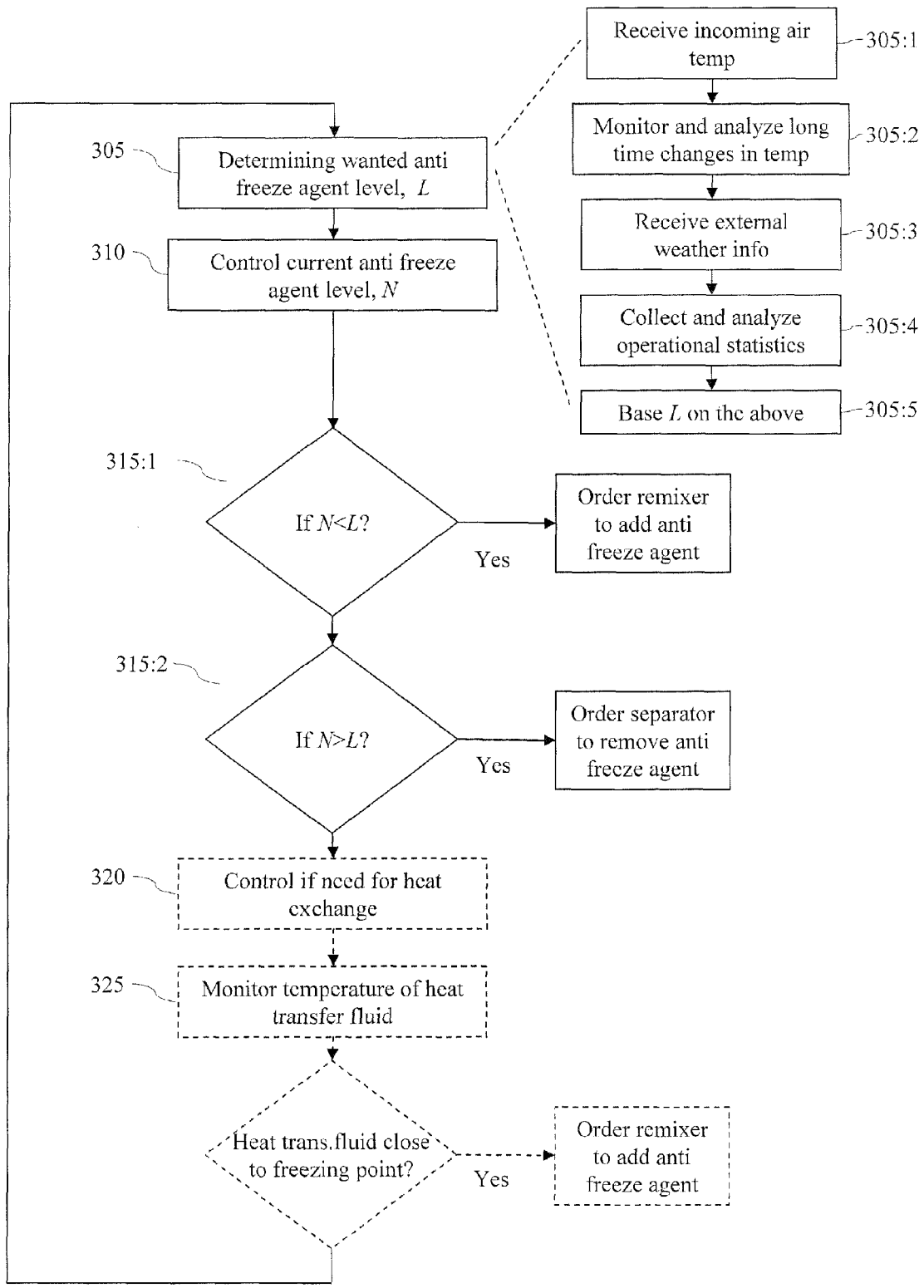
FIG. 3 is a flowchart of the method of controlling the level of anti freeze agent according to the invention.

The method according to the invention will be described with reference to the flowchart of FIG. 3, and comprises the steps of:

305: Determining a wanted level of anti freeze agent, L. The determination is preferably performed by the control unit 285 and is based, at least partly on the temperature of the incoming air as supplied by the incoming air temperature sensor 275. The known concordance between freezing points and the level of anti freeze agent for specific agent, or combination of agents, are referred. If, for example, the incoming air is X degrees, the level L is determined as a level of the anti freeze agent giving a freezing point of the heat transfer fluid a predetermined amount below the temperature X.

310: Control the current level, N, of the anti freezing agent. This is preferably done by using the anti freeze agent level indicator 240. Alternatively the current level can be an estimated value.

315: Comparing the current level, N, of anti freeze agent with the wanted level, L, and if 315:1—the current level, N, is below the wanted level L, N<L, an order is issued to the remixer 250 to add an amount of anti freeze agent to the heat transfer fluid. The amount is determined based on the difference between the current level and the wanted level, L−N.

315:2—the current level, N, is above the wanted level L, N>L, an order is issued to the separator 245 to remove an amount of anti freeze agent to the heat transfer fluid. The amount is determined based on the difference between the wanted level and the current level and, N−L.

320: In an optional step the control unit monitors if the there is no requirement for heat exchange, for example during summer, in which case the heat exchange system is turned off, or kept in a resting mode, wherein pumps etc are put into operation at pre-determined intervals for conditioning reasons.

The process of adding or removing anti freeze agent to/from the heat transfer fluid is typically not an instant process. Preferably, this process should be performed at the most daily, and even more preferably on a weekly basis. i.e. the optimization of the level of anti freeze agent should be taking care of the long term fluctuations, for example change of seasons, rather than short term fluctuations, such as daily or hourly temperature fluctuations. The time span of optimization should therefore be chosen with consideration of the complexity of the separation/remixing procedures. If, for example, the separation procedure, takes in the order of a day to perform, the optimization should be at the least on a weekly basis. On the other hand, if a quick and responsive separation method is available, a shorter optimization period could be considered.

The step of determining a wanted level of anti freeze agent, L, step 305 may comprise a number of substeps:

| 305:1 | Receiving the temperature of the incoming air as supplied by the incoming air temperature sensor 275. |
|---|---|
| 305:2 | Monitor long time changes of the temperature of the incoming air, for example by analysing the temperature/time derivative, or determining an average for a predetermined time period, for example a week or a couple of days. |
| 305:3 | Receiving external information in form of temperature forecast from an external source. Such forecasts, which can be automatically interpreted, are available from weather service for example on the Internet. Alternatively, temperature statistics for the location can be used. |
| 305:4 | Use internal statistics over the relations between incoming air temperature, previously chosen levels of anti freezing agents for that temperature and the resulting temperature of the heat transfer fluid as supplied by the temperature sensor 280. |
| 305:5 | Use the information from steps 305:1-305:4, or some of the steps, to determine the wanted level of anti freeze agent, L. |

In general, in the temperature variations are fairly slow. However, occasionally the temperature may change very rapidly. A sudden increase impose no problems, other than a temporary low efficiency, but a sudden drop in outside temperature, larger than catered for by the predetermined safety margin described above, may cause freezing of the heat transfer fluid in or nearby the heat delivering unit 230. This can be avoided by monitoring the temperature of the heat transfer fluid, as described by the additional and optional step of:

| 325: | Continuously monitor the heat transfer fluid temperature sensor 280, to detect if the temperature approaches the freezing point associated with the current level of anti freezing agent. If the freezing point is approached, initiate that the remixer 245 adds anti freezing agent to the heat transfer fluid. |
|---|---|

Step 325 can be seen as a safety override of the normal operation and should typically be accompanied with a warning or alert issued to an operator.

The gathering and analysing of temperature and performance statistics of step 305:4 can be used to get a local adaptation of the recommend mixing proportions typically supplied by the manufacturer of the freezing agent. The potential freezing in the heat delivery unit 230, will be dependent not only on the temperature and flow of the incoming air, but also on design and implementation factors, such as if the heat exchange system 200 is placed in heated spaces, the speed of the flow of the heat transfer fluid, the geometry of the heat delivery unit 230 etc. By comparing for example the temperature of the incoming air with the temperature of the heat transfer fluid an indication is given of the local requirements of adding anti freeze agent. If for example the heat transfer fluid is found to never go below −5° C. regardless of the temperature of the incoming air, it is unnecessary to provide a level of the anti freeze agent that gives a freezing point below that temperature. Hence, the control unit can update its concordance list of temperatures and level of anti freeze agent accordingly. On the other hand if the temperature of the heat transfer fluid constantly is lower than initially expected, due to a high incoming airflow, for example, the concordance list should be changed to indicate a higher level of freezing agent for a given outside temperature. Examples of a procedure for determining anti freeze agent level using stored concordance lists and how these could be adapted will be given below.

One example of local factors influencing the heat transfer properties. Å. Melinder has in "Thermophysical Properties of Liquid Secondary Refrigerants", KTH 1998, discussed how the flow in the tubes of the heat exchanger, in combination with the properties of the heat transfer fluid, influences the heat transfer. The heat transfer is shown to be given by:

$$h_{turb} = F_{hturb} \cdot w^{0.8}/d^{0.2} [W/(m^2 K)] \quad (1)$$

Wherein w is the fluid velocity in the heat exchanger tubes and d is the diameter of the tubes. $F_{hturb}$ is the heat transfer factor for turbulent flow and is given by $$F_{hturb} = 0.023 \, k^{2/3} \cdot (\rho \cdot Cp)^{1/3} \cdot v^{1/3 - 0.8}$$

For a laminar flow the corresponding relation will be:

$$h_{lam} = F_{hlam} \cdot (w/(d-L))^{1/3} [W/(m^2 K)] \quad (2)$$

and $F_{hlam}$ will be given by $F_{lam} = 1.86 \, k^{2/3} \cdot (\rho \cdot Cp)^{1/3}$ With this knowledge tables as exemplified in table 2 and 3 for anti freeze agent sodium chloride and ethylene glycol, respectively, can be produced. These tables can be used as the concordance list used in the method according to the invention to determine a correct level of anti freeze agent. These initial concordance list may, if during operation as described above, if it is determined that the heat transfer is not as expected, for example, by modified according to the gather statistics. One modification could be to measure the heat transfer with the aid of the temperature sensors 278 and 277 before and after the collector 225 to determine an experimental heat transfer for a given condition, for example a given outside temperature and level of anti freeze agent. The result can be compared to the initial concordance lists, which are modified if a discrepancy is found. The modification can with some assumptions be made also for other temperatures/levels than the measured conditions. Thus it will be possible to dynamic concordance lists, which will further increase the efficiency and flexibility of the system and method of operation according to the present invention.

Suitable separating technique used by the separator 245 depend primarily on the type of anti freezing agent chosen, but preferably also on the requirements with regards to volume and expected temperature fluctuation, i.e. how time consuming the process can be allowed to be. Typically the two basic categories, the anti freeze agents the based on salt solutions, for example alkali salts, and anti freeze agents based on organic hydrocarbons, for example alcohol or glycol, require significantly different separating techniques. Several techniques for both categories are known in the art and apparatus are commercially available. Anti freeze agents based on hydrocarbons can be separated from water with for example filtering techniques, electro dialysis, centrifugal techniques or by sediment/gravitational tanks. The salts used in some anti freeze agents can be removed with various electrochemical methods, for example electrolysis. The examples should be seen as non-limiting.

The remixing is typically a less complicated process than the separation. However, care must be taken to achieve a uniform mixture of the heat transfer fluid and not introduce air or pollutions.

Anti freeze agents are commercially available under brand name such as Dowtherm™, Dowfrost™ and Dowcal™ (ethylene/propylene based) from Dow Chemical Company and Temper™ (salt based) from Temper Technology AB.

The method and arrangement according to the present invention is by no means limited to heat exchange systems for ventilation purposes. The same problems may occur in for example sun panel arrangements, greenhouse heating systems, systems for heating roads, airstrips and outdoor pedestrian areas, wherein the invention, with modifications which are apparent for the skilled person, can be advantageously utilized.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

TABLE 2

| Freezing point temp. °C. | Percent by weight % | Temp. °C. | Factor (ρ-Cp) kJ/m3, K | Reynolds number factor FRe | TURBULENT Factor Fhturb | TURBULENT Factor Fpturb | LAMINAR Factor Fhlam | LAMINAR Factor Fplam |
|---|---|---|---|---|---|---|---|---|
| 0 | 0 | 40 | 4145 | 15194 | 2078 | 5.30 | 219 | 0.021 |
|  |  | 30 | 4160 | 12477 | 1870 | 5.53 | 216 | 0.026 |
|  |  | 20 | 4174 | 9962 | 1656 | 5.80 | 213 | 0.032 |
|  |  | 10 | 4191 | 7649 | 1436 | 6.12 | 209 | 0.042 |
|  |  | 0 | 4217 | 5595 | 1218 | 6.52 | 205 | 0.057 |
| −5 | 14.0 | 40 | 4080 | 11099 | 1650 | 5.74 | 201 | 0.029 |
|  |  | 30 | 4082 | 9209 | 1493 | 5.98 | 199 | 0.035 |
|  |  | 20 | 4088 | 7162 | 1310 | 6.31 | 196 | 0.045 |
|  |  | 10 | 4086 | 5307 | 1119 | 6.71 | 193 | 0.051 |
|  |  | 0 | 4080 | 3649 | 946 | 7.17 | 189 | 0.085 |
|  |  | −5 | 4084 | 3211 | 861 | 7.44 | 168 | 0.102 |
| −10 | 23.6 | 40 | 3992 | 9116 | 1409 | 6.04 | 189 | 0.036 |
|  |  | 30 | 3991 | 7381 | 1280 | 6.33 | 189 | 0.044 |
|  |  | 20 | 3981 | 5659 | 1100 | 6.70 | 184 | 0.058 |
|  |  | 10 | 3967 | 4116 | 933 | 7.16 | 181 | 0.080 |
|  |  | 0 | 3954 | 2940 | 785 | 7.67 | 178 | 0.113 |
|  |  | −10 | 3935 | 1938 | 635 | 8.36 | 175 | 0.171 |
| −15 | 30.5 | 40 | 3909 | 7687 | 1241 | 6.30 | 180 | 0.043 |
|  |  | 30 | 3892 | 6161 | 1104 | 6.62 | 177 | 0.054 |
|  |  | 20 | 3875 | 4744 | 963 | 7.00 | 175 | 0.070 |
|  |  | 10 | 3859 | 3442 | 817 | 7.49 | 172 | 0.097 |
|  |  | 0 | 3834 | 2405 | 680 | 8.07 | 169 | 0.139 |
|  |  | −10 | 3809 | 1541 | 544 | 8.84 | 167 | 0.218 |
|  |  | −15 | 3797 | 1220 | 483 | 9.27 | 165 | 0.275 |
| −20 | 36.2 | 40 | 3807 | 6684 | 1114 | 6.52 | 172 | 0.050 |
|  |  | 30 | 3793 | 5399 | 995 | 6.84 | 170 | 0.062 |
|  |  | 20 | 3774 | 4122 | 864 | 7.26 | 168 | 0.081 |
|  |  | 10 | 3747 | 2936 | 727 | 7.80 | 165 | 0.115 |
|  |  | 0 | 3719 | 2049 | 506 | 8.41 | 163 | 0.165 |
|  |  | −10 | 3692 | 1339 | 489 | 9.18 | 160 | 0.253 |
|  |  | −20 | 3667 | 797 | 378 | 10.2 | 158 | 0.426 |
| −25 | 41.1 | 40 | 3724 | 5960 | 1014 | 6.71 | 166 | 0.056 |
|  |  | 30 | 3699 | 4742 | 900 | 7.06 | 163 | 0.071 |
|  |  | 20 | 3678 | 3622 | 783 | 7.50 | 161 | 0.093 |
|  |  | 10 | 3645 | 2574 | 657 | 8.06 | 159 | 0.132 |
|  |  | 0 | 3616 | 1785 | 546 | 8.70 | 157 | 0.190 |
|  |  | −10 | 3582 | 1146 | 437 | 9.54 | 154 | 0.298 |
|  |  | −20 | 3549 | 685 | 339 | 10.6 | 152 | 0.499 |
|  |  | −25 | 3531 | 505 | 291 | 11.3 | 150 | 0.678 |
| −30 | 45.4 | 40 | 3651 | 5379 | 935 | 6.89 | 160 | 0.062 |
|  |  | 30 | 3615 | 4250 | 827 | 7.26 | 158 | 0.079 |
|  |  | 20 | 3588 | 3222 | 717 | 7.72 | 156 | 0.105 |
|  |  | 10 | 3557 | 2290 | 603 | 8.30 | 154 | 0.149 |
|  |  | 0 | 3526 | 1551 | 495 | 9.02 | 151 | 0.221 |
|  |  | −10 | 3491 | 1004 | 398 | 9.87 | 149 | 0.342 |
|  |  | −20 | 3452 | 598 | 308 | 11.0 | 147 | 0.576 |
|  |  | −30 | 3410 | 327 | 229 | 12.4 | 145 | 1.06 |
| −35 | 49.3 | 40 | 3607 | 4898 | 872 | 7.05 | 156 | 0.059 |
|  |  | 30 | 3569 | 3879 | 771 | 7.43 | 154 | 0.087 |
|  |  | 20 | 3536 | 2871 | 660 | 7.93 | 152 | 0.119 |
|  |  | 10 | 3494 | 2038 | 555 | 8.54 | 149 | 0.168 |
|  |  | 0 | 3453 | 1351 | 451 | 9.30 | 147 | 0.254 |
|  |  | −10 | 3406 | 856 | 359 | 10.2 | 145 | 0.403 |
|  |  | −20 | 3365 | 510 | 278 | 11.4 | 143 | 0.578 |
|  |  | −30 | 3315 | 275 | 205 | 12.9 | 141 | 1.26 |
|  |  | −35 | 3291 | 191 | 171 | 13.9 | 139 | 1.82 |

TABLE 3

| Freezing point temp. °C. | Percent by weight % | Temp. °C. | Factor (ρ-Cp) kJ/m3, K | Reynolds number factor FRe | TURBULENT | | LAMINAR | |
|---|---|---|---|---|---|---|---|---|
| | | | | | Factor Fhturb | Factor Fpturb | Factor Fhlam | Factor Fplam |
| −5 | 7.9 | 30 | 4019 | 11435 | 1761 | 5.95 | 212 | 0.029 |
| | | 20 | 4014 | 9174 | 1562 | 6.23 | 208 | 0.037 |
| | | 10 | 4010 | 7247 | 1370 | 6.55 | 204 | 0.047 |
| | | 0 | 4005 | 5469 | 1174 | 6.95 | 199 | 0.062 |
| | | −5 | 4004 | 4617 | 1073 | 7.20 | 197 | 0.074 |
| −10 | 14.1 | 30 | 3944 | 10252 | 1652 | 6.34 | 209 | 0.034 |
| | | 20 | 3942 | 8341 | 1475 | 6.63 | 206 | 0.042 |
| | | 10 | 3939 | 6577 | 1293 | 6.97 | 201 | 0.054 |
| | | 0 | 3931 | 4929 | 1107 | 7.42 | 197 | 0.072 |
| | | −10 | 3923 | 3478 | 925 | 7.98 | 194 | 0.102 |
| −15 | 18.8 | 30 | 3920 | 9364 | 1570 | 6.66 | 207 | 0.039 |
| | | 20 | 3920 | 7638 | 1403 | 6.97 | 204 | 0.048 |
| | | 10 | 3920 | 6016 | 1232 | 7.34 | 200 | 0.061 |
| | | 0 | 3917 | 4498 | 1055 | 7.81 | 196 | 0.082 |
| | | −10 | 3908 | 3153 | 878 | 8.42 | 193 | 0.117 |
| | | −15 | 3903 | 2562 | 787 | 8.79 | 190 | 0.144 |
| −20 | 22.6 | 30 | 3902 | 8615 | 1501 | 6.95 | 206 | 0.043 |
| | | 20 | 3907 | 6952 | 1335 | 7.29 | 203 | 0.054 |
| | | 10 | 3912 | 5507 | 1177 | 7.67 | 199 | 0.068 |
| | | 0 | 3917 | 4133 | 1011 | 8.16 | 196 | 0.091 |
| | | −10 | 3916 | 2851 | 834 | 8.83 | 192 | 0.133 |
| | | −20 | 3905 | 1855 | 669 | 9.65 | 188 | 0.205 |

The invention claimed is:

1. A method of optimizing a level of an antifreeze agent in a heat transfer fluid of a heat exchange system of a ventilation system, comprising the steps of:
operating the heat exchange system of the ventilation system i) to deliver heat to incoming air by outgoing air heating the heat transfer fluid, and ii) for the heat transfer fluid to transfer the heat collected from the outgoing air to warm incoming air, the operating step including monitoring a temperature of the incoming air, wherein the level of the antifreeze agent in the heat transfer fluid is dependent on the temperature of the incoming air;
monitoring a temperature of the heat transfer fluid;
determining a wanted level of the antifreeze agent based on the monitored temperature of the incoming air; and
controlling a current level of the antifreeze agent in the heat transfer fluid including i) adding further antifreeze agent to the heat transfer fluid when the current level is a predetermined amount lower than the wanted level, and ii) removing an amount of the antifreeze agent from the heat transfer fluid when the current level is a predetermined amount higher than the wanted level,
wherein said determining step further comprises determining the wanted level of the antifreeze agent further based on long-term statistics over relations between the monitored incoming air temperature, previously chosen levels of the antifreeze agent associated with the monitored temperature of the incoming air, and a resulting temperature of the heat transfer fluid for a local installation, the long-term statistics being based on actual monitored incoming air temperature values and the monitored resulting temperature of the heat transfer fluid for the local installation in the operation of the heat exchange system of the ventilation system.

2. The method according to claim 1, wherein said determining step further comprises determining the wanted level of the antifreeze agent further based on long-time changes of the temperature of the incoming air.

3. The method according to claim 1, wherein said determining step further comprises determining the wanted level of the antifreeze agent further based on a temperature forecast from an external source.

4. The method according to claim 1, wherein said determining step further comprises determining the wanted level of the antifreeze agent further based on a temperature forecast from an external source.

5. The method according to claim 1, wherein said controlling step controls the current level of the antifreeze agent in the heat transfer fluid by the adding of the further antifreeze agent to the heat transfer fluid when the current level is the predetermined amount lower than the wanted level, the wanted level based on avoiding freezing of the heat transfer fluid based on the monitored temperature of the incoming air and a freezing point of the heat transfer fluid.

6. The method according to claim 1, wherein said controlling step controls the current level of the antifreeze agent in the heat transfer fluid by i) the adding of the further antifreeze agent to the heat transfer fluid when the current level is the predetermined amount lower than the wanted level, and ii) the removing of the amount of the antifreeze agent from the heat transfer fluid when the current level is the predetermined amount higher than the wanted level, the wanted level based on avoiding freezing of the heat transfer fluid based on the monitored temperature of the incoming air, a freezing point of the heat transfer fluid, and maximizing heat transfer efficiency of the heat transfer fluid.

7. A heat exchange system (200) of a ventilation system configured to deliver heat to incoming air by outgoing air heating a heat transfer fluid, for the heat transfer fluid to transfer the heat to warm incoming air, a level of an antifreeze agent in the heat transfer fluid being dependent on a temperature of the incoming air, the system comprising:
a heat collector unit (225) configured to collect the heat from the outgoing air;
a heat deliver unit (230) configured to deliver the heat collected from the outgoing air to the incoming air, the heat collector unit and the heat deliver unit in fluid communication with each other;
a separator (250) adapted to separate and remove an amount of the antifreeze agent from the heat transfer fluid;

a remixer (245) adapted to add a part of the antifreeze agent to the heat transfer fluid;

a first temperature sensor (275) configured to monitor the temperature of the incoming air, the first temperature sensor located upstream of the heat delivery unit (230);

a second temperature sensor (280) configured to monitor a temperature of the heat transfer fluid; and a control unit (285) operatively connected with the separator (250), the remixer (245), and the first and second temperature sensors (275, 280), the control unit adapted to analyse current temperature data provided by the first and second temperature sensors (275) and to selectively order i) the separator to remove the amount of the antifreeze agent from the heat transfer fluid, and ii) the remixer to add the part of the antifreeze agent to the heat transfer fluid, based on the analysis of the current temperature data, wherein the heat collector unit i) delivers heat to incoming air by outgoing air heating the heat transfer fluid, and ii) transfers the heat from the heat transfer fluid to transfer to warm incoming air, wherein the control unit, in the analysis of the current temperature data, is adapted to further analyse long-term statistics over relations between the monitored incoming air temperature, previously chosen levels of the antifreeze agent associated with the monitored temperature of the incoming air, and a resulting temperature of the heat transfer fluid for a local installation, the long-term statistics being based on actual monitored incoming air temperature values and the monitored resulting temperature of the heat transfer fluid for the local installation in the operation of the heat exchange system of the ventilation system.

8. The heat exchange system of claim 7, wherein the control unit comprises an external communication unit for receiving at least one of external temperature and weather forecasts, the received at least one of the external temperature and the weather forecasts being used in the analysis of the current temperature data.

9. The heat exchange system according to claim 7, wherein said control unit controls a current level of the antifreeze agent in the heat transfer fluid by ordering the remixer to add the part of the antifreeze agent to the heat transfer fluid when the current level is a predetermined amount lower than a wanted level, the wanted level based on avoiding freezing of the heat transfer fluid based on the monitored temperature of the incoming air.

10. The heat exchange system according to claim 7, wherein said control unit controls the current level of the antifreeze agent in the heat transfer fluid by i) ordering the the remixer to add the part of the antifreeze agent to the heat transfer fluid when the current level is a predetermined amount lower than a wanted level, and ii) ordering the separator to remove the amount of the antifreeze agent from the heat transfer fluid when the current level is a predetermined amount higher than the wanted level, the wanted level based on avoiding freezing of the heat transfer fluid based on the monitored temperature of the incoming air while maximizing heat transfer efficiency of the heat transfer fluid.

11. The heat exchange system according to claim 9, wherein the wanted level is based on avoiding freezing of the heat transfer fluid based on i) the monitored temperature of the incoming air and ii) a freezing point of the heat transfer fluid.

12. The heat exchange system according to claim 10, wherein the wanted level is further based on a freezing point of the heat transfer fluid.

13. A heat exchange system (200) of a ventilation system configured to deliver heat to incoming air by outgoing air heating a heat transfer fluid, for the heat transfer fluid to transfer the heat received from the outgoing air to warm incoming air, a level of an antifreeze agent in the heat transfer fluid being regulated dependent on a temperature of the incoming air, the system comprising:

a heat collector unit (225) located with an outgoing air duct and configured to collect the heat from the outgoing air;

a heat deliver unit (230) located in an incoming air duct and configured to deliver the heat collected from the outgoing air to the incoming air, the heat collector unit and the heat deliver unit in fluid communication with each other;

a separator (250) connected to the heat deliver unit and adapted to separate and remove an amount of the antifreeze agent from the heat transfer fluid;

a remixer (245) connected to the separator and to the heat collector unit, the remixer adapted to add a part of the antifreeze agent removed from by the separator back into the heat transfer fluid;

a first temperature sensor (275) configured to monitor the temperature of the incoming air, the first temperature sensor located upstream of the heat delivery unit (230);

a second temperature sensor (280) configured to monitor a temperature of the heat transfer fluid; and a control unit (285) operatively connected with the separator (250), the remixer (245), and the first and second temperature sensors (275, 280), the control unit adapted to analyse current temperature data provided by the first and second temperature sensors (275) and order i) the separator to remove the amount of the antifreeze agent from the heat transfer fluid, and ii) the remixer to add the part of the antifreeze agent to the heat transfer fluid, based at on the analysis of the current temperature data, wherein the heat collector unit i) delivers heat to incoming air by outgoing air heating the heat transfer fluid, and ii) transfers the heat from the heat transfer fluid to transfer to warm incoming air, wherein said control unit controls a current level of the antifreeze agent in the heat transfer fluid by ordering the remixer to add the part of the antifreeze agent to the heat transfer fluid when the current level is a predetermined amount lower than a wanted level, the wanted level based on avoiding freezing of the heat transfer fluid based on the monitored temperature of the incoming air, and wherein the wanted level is based on avoiding freezing of the heat transfer fluid based on i) the monitored temperature of the incoming air, ii) a freezing point of the heat transfer fluid, and iii) the monitored temperature of the heat transfer fluid, wherein the control unit, in the analysis of the current temperature data, is adapted to further analyse long-term statistics over relations between the monitored incoming air temperature, previously chosen levels of the antifreeze agent associated with the monitored temperature of the incoming air, and a resulting temperature of the heat transfer fluid for a local installation the long-term statistics being based on actual monitored incoming air temperature values and the monitored resulting temperature of the heat transfer fluid for the local installation in the operation of the heat exchange system of the ventilation system.

14. The heat exchange system according to claim 13, wherein the wanted level is based on avoiding freezing of the heat transfer fluid based while maximizing heat transfer efficiency of the heat transfer fluid.

* * * * *

UNITED STATES PATENT AND TRADEMARK OFFICE
CERTIFICATE OF CORRECTION

PATENT NO. : 8,464,783 B2
APPLICATION NO. : 12/282384
DATED : June 18, 2013
INVENTOR(S) : Mikael Nutsos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this
Eighth Day of September, 2015

Michelle K. Lee
*Director of the United States Patent and Trademark Office*